Nov. 28, 1944.  J. A. NORTON  2,363,742
FURNACE
Filed Feb. 10, 1941  2 Sheets-Sheet 1

INVENTOR
John A. Norton
BY Fred C. Matheny
ATTORNEY

Nov. 28, 1944. J. A. NORTON 2,363,742
FURNACE
Filed Feb. 10, 1941 2 Sheets-Sheet 2

INVENTOR
John A. Norton
BY Fred G. Matheny
ATTORNEY

Patented Nov. 28, 1944

2,363,742

UNITED STATES PATENT OFFICE 2,363,742

FURNACE

John A. Norton, Indianapolis, Ind.

Application February 10, 1941, Serial No. 378,152

4 Claims. (Cl. 126—110)

My invention relates to a furnace and an object of my invention is to provide a furnace that is simple and inexpensive in construction and highly efficient in operation.

Another object is to provide a furnace having highly efficient heat pick-up means whereby substantially all of the heat will be removed from the by-products of combustion before they reach the stack.

Another object is to provide means for taking care of liquid condensation in the smoke passageways, which condensation results from the high efficiency of the heat pick up means employed in my furnace.

Another object is to provide a furnace in which all of the pipes carrying flue gases and by-products of combustion slope toward a liquid trap and drain into said liquid trap to thereby provide for the disposal of all liquids that condense in the pipes, the condensation in this furnace being due to the fact that the flue gases are reduced to a very low temperature before passing to the chimney.

It is common practice in all heating installations to allow the flue gases and by-products of combustion to pass into the chimney or stack at a comparatively high temperature and before substantially all of the useful heat has been extracted therefrom. If these flue gases in ordinary heating plants are not discharged before they become cool then condensation, out of these gases, of moisture containing creosote, acids and the like takes place within the furnace and within the flue gas passageways resulting in undesirable leakage of these condensation products and rapid deterioration of the parts with which they come in contact. It is an object of my invention to provide a highly efficient heat pick up means for extracting substantially all of the useful heat from the flue gases and provide efficient means for draining off and taking care of all products of condensation resulting from the operation of the highly efficient heat pick up means.

Other objects of my invention are to provide a furnace that is made up of two readily detachable sections so as to facilitate getting the same through doors and into basements and like places, to provide a furnace in which the cold air conduits are curved in such a manner as to avoid sharp corners thereby doing away with air eddies at these locations, to provide a furnace in which the combustion chamber is completely surrounded by passageways for the air that is to be heated so that the escape of heat into the furnace room is reduced to a minimum, and to provide a furnace in which the combustion chamber portion is connected with the furnace housing by leak proof expansion joint means that will not be adversely affected by expansion and contraction.

Other objects of this invention will be apparent from the following description taken in connection with the accompanying drawings.

In the drawings.

Like reference numerals designate like parts throughout the several views.

Figure 1:
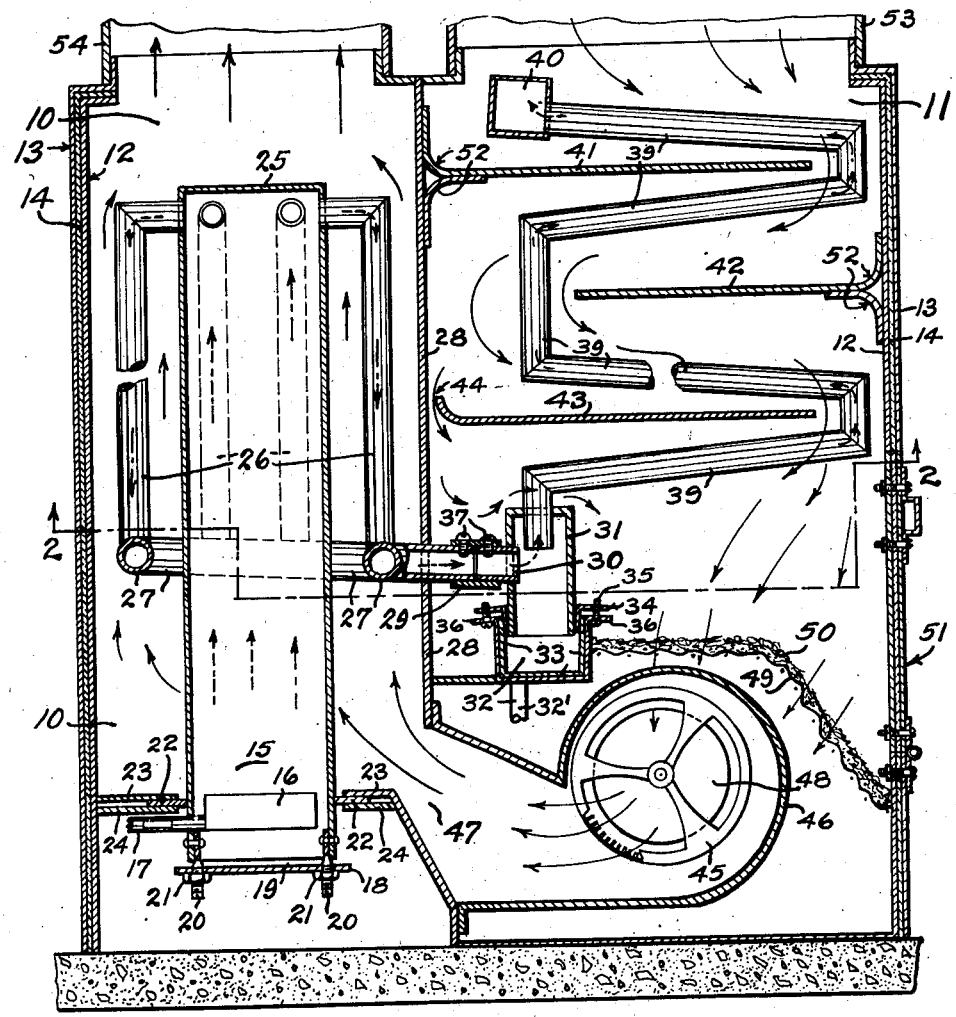
Fig. 1 is a view in vertical section taken substantially on broken line 1—1 of Fig. 2 of a gas furnace constructed in accordance with my invention, parts being broken away.
Figure 3:
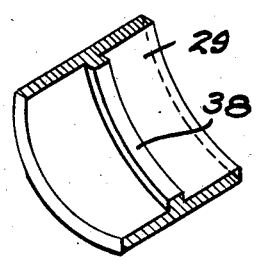
Fig. 3 is a fragmentary perspective view on an enlarged scale of a detail of the invention.
Figure 2:
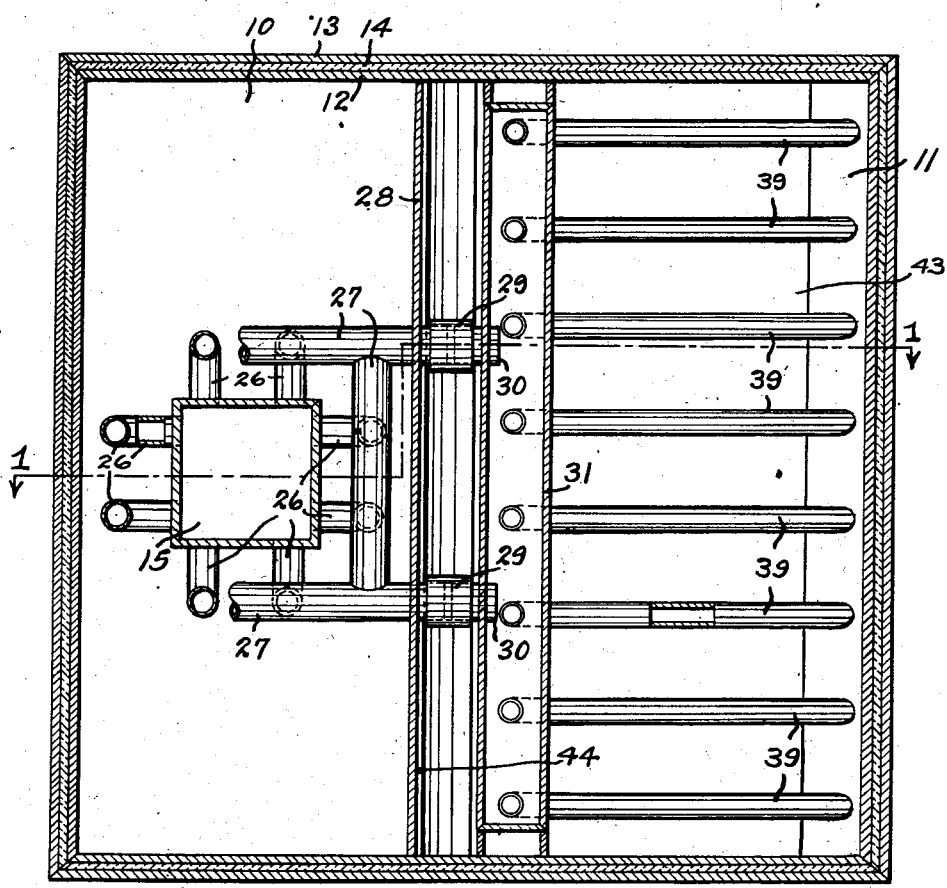
Fig. 2 is a view in cross section taken substantially on broken line 2—2 of Fig. 1.

Referring to Figs. 1 and 2, I show a furnace that is adapted to use gas as a fuel.

This furnace comprises a housing providing two air circulation compartments 10 and 11 positioned side by side.

Preferably the housing is made up of an inner sheet metal wall 12, an outer sheet metal wall 13 and a layer 14 of heat insulating material, such as asbestos, disposed between the walls 12 and 13.

An upright combustion chamber 15, preferably of square cross section, is disposed within the chamber 10. A gas burner 16 of any suitable form is provided in the lower end portion of the combustion chamber 15. A gas supply pipe 17 is connected with the gas burner 16.

A plate 18 is positioned a short distance below the bottom end of the combustion chamber 15 so as to leave an inlet opening 19 for air. The plate 18 is supported by bolts 20 that are secured to the walls of the combustion chamber 15 and have nuts 21 thereon. Adjustment of the nuts 21 will vary the distance of the plate 18 from the bottom end of the combustion chamber 15 thus adjusting the area of the air inlet opening 19. This adjustment is ordinarily made at the time the furnace is installed and will not need to be changed after it is once properly adjusted. It will be noted that the opening 19 admits an evenly distributed amount of air from all sides of the combustion chamber thus promoting efficient operation of the gas burner.

Preferably the combustion chamber 15 has external flanges 22 thereon adjacent its lower end and these flanges fit between spaced apart plates 23 and 24 that are rigid with the furnace walls. This provides an efficient support for the combustion chamber and also provides an expansion joint in the partition between the air chamber 10 and the space below said air chamber into which the combustion chamber opens.

The flanges 22 are preferably welded to the combustion chamber 15 and extend entirely around the same. The plates 23 and 24 fit tightly against the flanges 22 and form a leak proof joint that is not adversely affected by expansion and contraction and that will not open up and allow gases from the compartment below to get into the air compartment 10.

The upper end of the combustion chamber 15 is closed by a top wall 25.

A plurality of tubes or smoke conduits 26 of inverted L shape are connected with the upper end portion of the combustion chamber 15 just below the top wall 25. These tubes 26 extend downwardly along the outside of the combustion chamber 15 and communicate at their lower ends with manifold pipes 27.

Preferably two of the manifold pipes 27 extend through a partition wall 28 that separates compartments 10 and 11 and these two pipes are connected by special fittings 29 with short pipes 30 that are welded or otherwise rigidly secured to the cap portion 31 of a moisture receptacle or trap 32.

Preferably the trap 32 has a non-corrosive acid proof lining 33 therein. Also sealing members 34 of angle shaped cross section are preferably provided between the cap portion 31 and the lining 33. These sealing members are preferably tapered to form a tight seal and are secured by screws 35 to outwardly extending flanges 36 on the trap 32.

The special fittings 29 form gas tight connections between the pipes 27 and 30 and are secured to said pipes 27 and 30 by screws 37 which may be quickly and easily removed or inserted to secure the two furnace units together. An annular rib 38 is provided in each fitting 29 for the ends of the pipes 27 and 30 to abut against and this helps to provide a gas tight joint.

A plurality of runs or units of flue gas tubing 39 are provided in side by side relation in the air compartment 11. In Fig. 2, I have shown eight runs or units of this tubing 39 positioned side by side but it will be understood that a greater or less number of these runs or units may be provided.

Each run or unit of this tubing 39 is made up of a plurality of straight sections inclined relative to the horizontal and positioned one above another and connected at their ends by shorter upright sections.

The lowermost end portion of each run of tubing 39 is connected with the cap member 31 of the condensate trap 32 and the uppermost end portion of each run of tubing 39 is connected with a flue gas manifold 40 that extends crosswise of the furnace housing and is adapted to be connected with a chimney.

Preferably the runs of tubing 39 are made up of sections of non-corrosive pipe of good heat conductive qualities, such as copper pipe, welded or brazed together.

All portions of the tubing units 39 are inclined relative to the horizontal in such a manner that any condensate which is condensed in said tubing 39 at any location between the condensate trap 32 and the flue gas manifold 40 will drain downwardly into the condensate trap 32.

The condensate trap 32 is provided with a drain pipe 32' which may be connected with a sewer or may be otherwise used to drain off condensate from the trap 32.

A plurality of baffle plates 43, 41 and 42 are provided in the air compartment 11 between the several sections of the pipes 39 to direct the air back and forth in the compartment 11 so that it will be kept in contact with the pipes 39 for a long period of time.

The uppermost baffle plate 41 extends outwardly from the wall 28 and terminates a short distance from the opposite wall of the compartment 11. The next adjacent baffle plate 42 extends from the outside wall of the furnace housing toward the wall 28 but terminates short of the wall 28. The lowermost baffle plate 43 is spaced a short distance from the wall 28 to provide a narrow opening 44 through which some air may pass downwardly and is spaced a greater distance from the outside wall of the compartment 11 so that most of the air will pass around the outer end of this baffle plate.

Preferably the baffle plates have curved portions 52 at the corner locations where they join the housing walls to assist in directing a smooth flow of air and to prevent eddies of air in these corners.

A driven fan 45 is provided in a fan housing 46 in the lowermost portion of the air compartment 11. The fan housing 46 is connected by a passageway 47 with the lower portion of the air compartment 10. Air from the space surrounding the fan housing enters said fan housing through openings 48 in the end portions of the fan housing and is discharged through the passageway 47 into the compartment 10. One opening 48 is shown.

A screen 49 is provided above the fan housing extending from the trap 32 to the outside wall of the furnace and an air filter or air cleaning pad 50 of the usual form is provided on the screen 49. Preferably the screen 49 and air filter 50 extend entirely across the housing so that most of the air which passes downwardly between the right hand end of the baffle plate 43, Fig. 1, and the adjacent furnace wall 12 will come in contact with and pass through the air filter.

A small amount of air will pass through the opening 44 between the wall 28 and the adjacent end of the baffle plate 43 and will pass over the condensate trap on its way to the fan and pick up heat from this portion of the housing and from the condensate trap.

Preferably a door 51 is provided in the housing wall shown at the right in Fig. 1 to afford access to the compartment containing the fan and the filters and the condensate trap.

An inlet conduit 53 for cold air is connected with the upper end portion of the air inlet chamber 11 and an outlet conduit 54 for heated air is connected with the upper end portion of the air chamber 10.

In the operation of the furnace shown in Figs. 1 and 2 the heated products of combustion move upwardly in the combustion chamber 15, which is relatively long in proportion to its cross sectional area. By the time these combustion products reach the upper end of the chamber 15 combustion thereof will be substantially complete. The hot combustion products will pass downwardly through the pipes 26 to the manifold pipes 27. Thence these products, which will be cooling as they travel, will pass through the cap member 31 and upwardly through the tubes 39 and out through the flue gas manifold 40 to the chimney.

The direction of movement of the air will, for the most part, be opposite to the direction of movement of the heated gases, the cold air entering the furnace at the location where the combustion gases are coldest and the heated air leaving the furnace from the hottest portion thereof. By thus providing a counterflow of heated gases and air it is possible to have the combustion gases leave the furnace at a temperature considerably lower than the temperature at which the air leaves the furnace.

My arrangement of the combustion chamber and the heat exchange pipes and conduits keeps the air that is to be heated in contact with the pipes that carry the combustion products for a long period of time. Also by providing numerous pipes of relatively small diameter I obtain a relatively large surface area for the exchange of heat.

All of the features above described cooperate to produce a furnace in which substantially all of the useful heat is taken out of the flue gases and these gases leave the furnace at a very low temperature. This results in the condensation of moisture in the flue gas conduits 26, 27 and 39, and especially in the colder conduits 39. This condensed moisture must be disposed of and the trap 32 provides an efficient and reliable means for taking care of the same.

The flue gases discharge from my furnace at a temperature below 100° F. In the ordinary gas furnace the temperature of discharging flue gas is above 300° F.

The trap thus cooperates to make possible and practical the use of the highly efficient heat exchange means provided in this furnace.

It is to be noted that all of the conduits 26, 27 and 39 are positioned so as to drain into the trap 32.

Preferably the conduit area through which the combustion products discharge is kept substantially constant from the point where the combustion products leave the combustion chamber to the discharge manifold 40.

Obviously changes in my invention may be made within the scope and spirit of the following claims.

I claim:

1. In a furnace, a combustion chamber; a furnace housing surrounding said combustion chamber, a heat exchange chamber; a condensate trap in said heat exchange chamber; a cap member of inverted trough shape forming a cover for said condensate trap; flue gas conduits in said furnace housing communicating with said combustion chamber and extending into said heat exchange chamber and communicating with said cap member; and other flue gas conduits in said heat exchange chamber communicating with said cap member, said cap member constituting a manifold for the passage of flue gas from one set of conduits to the other.

2. In a furnace, means forming a combustion chamber and a heat exchange chamber; a combustion unit in said combustion chamber, flue gas conduits provided in said combustion chamber; other flue gas conduits provided in said heat exchange chamber; a condensate trap connected with the lower end portions of the conduits in said heat exchange chamber and forming a flue gas manifold; short pipes communicating with and extending outwardly from said manifold; and readily releasable telescopic sleeve means adapted to connect said short pipes with the conduits from said combustion chamber.

3. In a furnace, means forming two air circulation chambers positioned side by side for the intake and discharge of air to be heated; air intake and discharge means connected with the upper end portions of the respective chambers; fan means positioned to draw air downwardly through said air intake chamber and force the same upwardly through said air discharge chamber; a combustion chamber of smaller cross sectional dimensions than said air discharge chamber extending substantially from bottom to top of said air discharge chamber; substantially horizontal smoke pipes extending around the combustion chamber at a substantial distance below the top thereof; upright smoke pipes connecting the upper end portion of said combustion chamber with said substantially horizontal smoke pipes; a plurality of spaced apart baffle plates in the air intake chamber alternately terminating in spaced relation from opposite walls thereof; a plurality of smoke pipes extending back and forth in the air circulation spaces between said baffles; a condensate trap having an upper manifold cap portion connected with the lower end portions of said last mentioned smoke pipes and with said substantially horizontal smoke pipes; all of said pipes having a downward incline to deliver to said condensate trap; flue means connected with the upper end portions of the smoke pipes in said air intake chamber; and an air filter extending across said air intake chamber above said fan means.

4. In a furnace, means forming two air circulation chambers positioned side by side for the intake and discharge of air to be heated; air intake and discharge means connected with the upper end portions of the respective chambers; fan means positioned to draw air downwardly through said air intake chamber and force the same upwardly through said air discharge chamber; a combustion chamber of smaller cross sectional dimensions than said air discharge chamber extending substantially from bottom to top of said air discharge chamber; substantially horizontal smoke pipe means extending around the combustion chamber at a substantial distance below the top thereof; a plurality of upright smoke pipes connected with the upper end portion of said combustion chamber and with said substantially horizontal smoke pipe means and extending longitudinally within said air discharge chamber; condensate removal means connected with said substantially horizontal smoke pipe means; a plurality of smoke pipes in said air intake chamber communicating with said substantially horizontal smoke pipe means; and flue means connected with the upper end portion of the smoke pipes in said air intake chamber.

JOHN A. NORTON.